US010321303B1

(12) United States Patent
Namiranian

(10) Patent No.: US 10,321,303 B1
(45) Date of Patent: Jun. 11, 2019

(54) SUBSCRIPTION MANAGEMENT SERVICE PAIRING

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/857,191

(22) Filed: Dec. 28, 2017

(51) Int. Cl.
*H04M 3/00* (2006.01)
*H04B 1/38* (2015.01)
*H04W 8/18* (2009.01)
*H04W 40/04* (2009.01)
*H04W 4/70* (2018.01)

(52) U.S. Cl.
CPC ............ *H04W 8/183* (2013.01); *H04W 4/70* (2018.02); *H04W 40/04* (2013.01)

(58) Field of Classification Search
CPC ....... H04W 4/005; H04W 4/70; H04W 8/183; H04W 40/04
USPC ........................................................ 455/419
See application file for complete search history.

(56) References Cited

U.S. PATENT DOCUMENTS

| 9,668,122 | B2* | 5/2017 | Petersson ............ H04W 8/183 |
| 2012/0260090 | A1* | 10/2012 | Hauck ................ H04L 63/0853 713/168 |
| 2013/0003655 | A1* | 1/2013 | Dietz ................. H04L 65/1016 370/328 |
| 2014/0031035 | A1 | 1/2014 | Tagg et al. |
| 2014/0143826 | A1* | 5/2014 | Sharp ................... G06F 21/604 726/1 |
| 2014/0287725 | A1* | 9/2014 | Lee ...................... H04W 12/06 455/411 |

(Continued)

FOREIGN PATENT DOCUMENTS

WO    2013048084 A2    4/2013

OTHER PUBLICATIONS

International Application No. PCT/US2018/064574, International Search Report and Written Opinion, dated Mar. 27, 2019, 10 pages.

*Primary Examiner* — Rafael Pérez-Gutiérrez
*Assistant Examiner* — Mark G. Pannell
(74) *Attorney, Agent, or Firm* — Han Santos, PLLC

(57) ABSTRACT

The pairing of an entity solely to a single subscription management service may simplify the deployment of an Embedded Subscriber Identity Module (eSIM) profile management platform. The pairing includes selecting a subscription management service as a sole provider of eSIM profile management to an entity. The subscription management service may be provided by one or more subscription managers that execute on one or more computing devices, the one or more subscription managers including at least one of a Subscription Manager Data Preparation (SM-DP) or a Subscription Manager Secure Routing (SM-SR). Subsequently, the entity is mapped solely to the subscription management service to configure the eSIM management platform to route profile management communications for the entity between the entity and the subscription management service. The eSIM management platform provides an application program interface (API) abstraction layer for the entity to initiate profile management operations with respect to the eSIM profiles.

20 Claims, 8 Drawing Sheets

(56) References Cited

U.S. PATENT DOCUMENTS

| | | |
|---|---|---|
| 2015/0121495 A1* | 4/2015 | Gao .................. H04W 12/04 |
| | | 726/6 |
| 2016/0006753 A1* | 1/2016 | McDaid ............. H04L 63/1425 |
| | | 726/23 |
| 2016/0007190 A1* | 1/2016 | Wane ................. H04W 4/50 |
| | | 455/419 |
| 2016/0020803 A1* | 1/2016 | Cha ................... H04W 76/10 |
| | | 455/558 |
| 2016/0057725 A1* | 2/2016 | Suh ................... G06Q 50/30 |
| | | 455/435.1 |
| 2016/0119780 A1 | 4/2016 | Jung et al. |
| 2016/0183081 A1* | 6/2016 | Flores Cuadrado ......................... |
| | | H04B 1/3816 |
| | | 455/558 |
| 2017/0033962 A1 | 2/2017 | Kim et al. |
| 2017/0094629 A1 | 3/2017 | Osterwise |
| 2017/0289788 A1* | 10/2017 | Lalwaney ........... H04L 41/0803 |
| 2017/0295491 A1* | 10/2017 | Gehrmann .......... H04W 12/06 |
| 2017/0311155 A1* | 10/2017 | Krey ................... H04W 12/04 |

\* cited by examiner

SUBSCRIPTION MANAGEMENT SERVICE PAIRING

BACKGROUND

The use of Embedded Universal Integrated Circuit Cards (eUICCs), also referred to as Embedded Subscriber Identity Modules (eSIMs), are becoming increasingly prevalent in consumer and machine-to-machine (M2M) communication fields. Unlike a traditional UICC or SIM card that exists as a removable smart card that is transferrable between multiple device, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a wireless communication carrier. Other data that are stored in the eSIM profile may include carrier network information, security authentication information, a list of accessible network services, and/or so forth. The wireless communication carrier may transfer an eSIM profile to the eUICC of a user device in the form of a consumer device or a M2M device via an over-the-air (OTA) update. Consumer devices are network-capable device that are generally marketed to individual consumers. For example, these devices may include a smartphone, a tablet computer, a smartwatch, a gaming console, and/or so forth. M2M devices are networked machines that use the telecommunication services provided by the wireless communication carrier to communicate with other networked machines. For example, a M2M monitoring device that is embedded on a vehicle may automatically send vehicle tracking and operation information to a remote support device at a control center. In another example, a M2M device in the form of a smart home appliance may automatically send diagnostic information to a monitoring device at a service center in case of device malfunction.

In order to provide eUICCs of user devices with eSIM profiles, a wireless communication carrier has to purchase or otherwise obtain the eSIM profiles from eSIM profile vendors. An eSIM profile vendor may be a manufacturer of eUICCs, and thus is able to generate eSIM profiles for installation in the eUICCs. Accordingly, the wireless communication carrier may place an order for a set of eSIM profiles for an eSIM profile vendor. The eSIM profile vendor then transfers the set of eSIM profiles to a profile data store of a subscription management service of the wireless communication carrier. Following the arrival of the set of eSIM profiles in the profile data store, an eSIM management platform of the wireless communication carrier may receive requests to provide specific eSIM profiles from the set of eSIM profiles to particular eUICCs. The requests may originate from a business support system (BSS) of the wireless communication carrier, BSSs of other wireless communication carriers that are hosted by the wireless communication carrier, or partner service or content providers of the wireless communication carrier. In turn, the eSIM management platform is responsible for triggering the subscription management service to distribute eSIM profiles to eUICCs of user devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
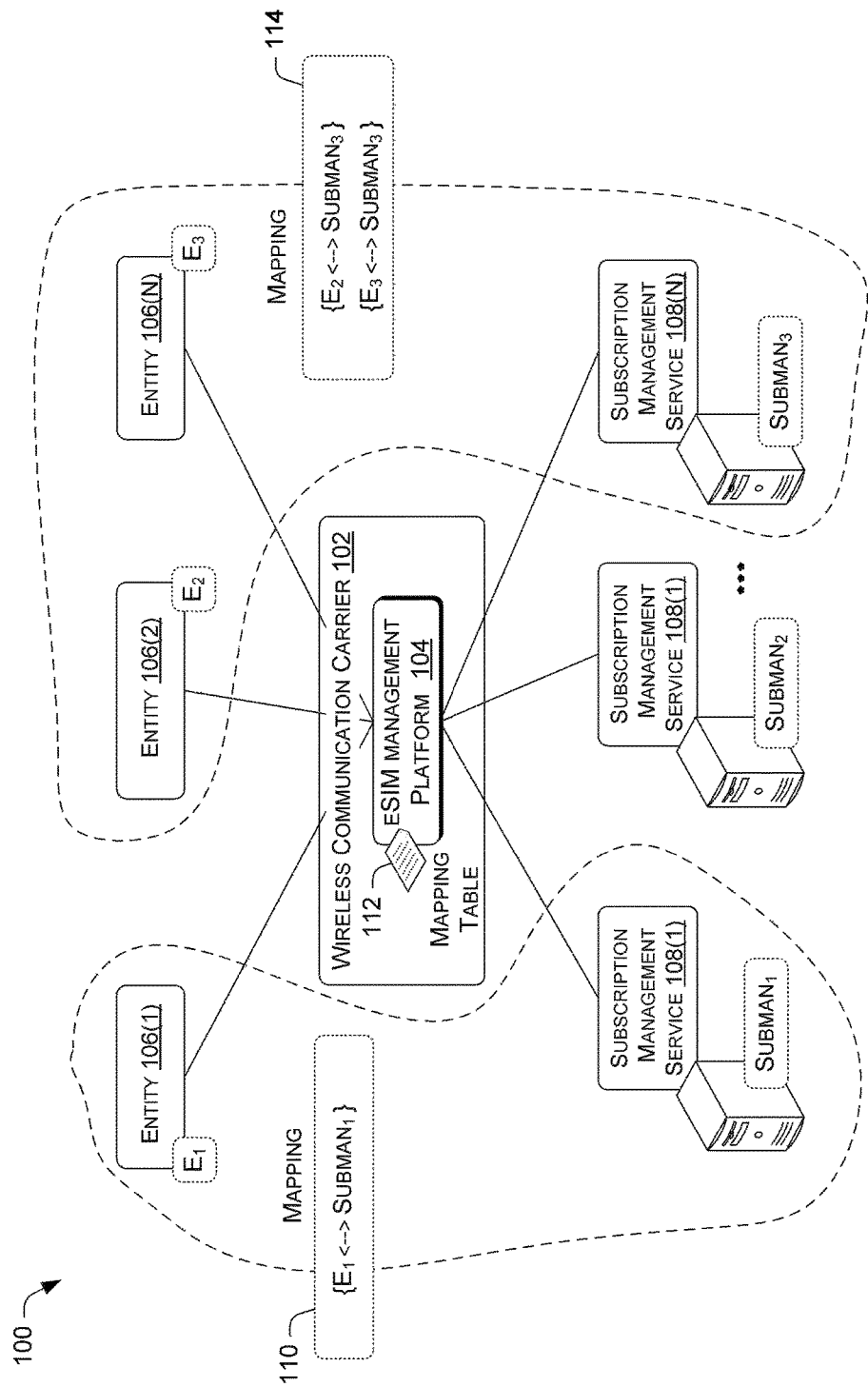
FIG. 1 illustrates an example architecture that enables the pairing of an entity that is receiving telecommunication services from a wireless communication carrier solely to a single subscription management service.

This disclosure is directed to techniques for pairing each entity solely to a single subscription management service. An entity may be a third-party partner of the wireless communication carrier, such as a M2M device vendor, a M2M device operator, and/or so forth. However, in other instances, an entity may be a network aggregator or a hub. A network aggregator or a hub is a telecommunication service provider that consolidates carrier services provided by multiple wireless communication carriers into a single carrier service for offering to subscribers. A subscription management service may be used by a wireless communication carrier, also referred to as a mobile network operator (MNO), to perform eSIM profile management for the entity. In various embodiments, the subscription management service is responsible for managing eSIM profiles provisioned to the eUICCs of machine-to-machine (M2M) devices that receive telecommunication services from the wireless communication carrier.

The subscription management service that is paired with the entity may be provided by one or more subscriber managers. In some embodiments, each of the subscription management services may be provided by at least one Subscription Manager Data Preparation (SM-DP), at least one Subscription Manager Data Preparation Plus (SM-DP+), and at least one Subscription Manager Secure Routing (SM-SR). The one or more subscriber managers of a subscription management service may be hosted by a data center of the wireless communication carrier. Alternatively, the subscriber managers may be hosted in a computing cloud of a third-party vendor for use by the wireless communication carrier. In some instances, such a third-party vendor may also be a manufacturer of eUICCs and a generator eSIM profiles for installation in the eUICCs.

The eSIM management platform is a backend service of a wireless communication carrier that serves as a central interface between the various entities and the subscription management services. The eSIM management platform enables the entities to manage the deployment of eSIM profiles into eUICCs of user devices. For example, the eSIM management platform may receive a request from an entity to perform a profile management task, such as provisioning an eUICC of a user device with an eSIM profile, activating an eSIM profile that is stored in the eUICC for use, or deleting an eSIM profile from the eUICC. In turn, the eSIM management platform may relay the request to the appropriate subscription management service that is responsible for managing the affected eSIM profile. Following the completion of the request, the eSIM management platform may provide a notification to the entity indicating that the profile management task has been performed. The pairing of a particular entity solely to a single subscription management service means that the paired subscription management service is exclusively responsible for performing profile management tasks with respect to the eSIM profiles of the particular entity. In other words, no other subscription management service is assigned or permitted to perform profile management tasks for the eSIM profiles of the particular entity.

The pairing of an entity solely to a single subscription management service may simplify the deployment of the eSIM management platform. Otherwise, in a scenario where there are multiple subscription management services handling eSIM profile management for one entity, the eSIM management platform has to perform additional processing to route eSIM profile management requests to the correct subscription management service for handling. For example, in such a scenario, the eSIM management platform may receive an eSIM profile management request from an entity for a particular eSIM profile. Subsequently, the eSIM management platform has to compare an integrated circuit card identifier (ICCID) of an eSIM profile or an eUICC identifier (EID) of an associated eUICC that is embedded in the request to a management routing table. Such a comparison enables the eSIM management platform to determine which of the multiple subscription management services is responsible for handling the profile management request for the particular eSIM profile. The eSIM management platform is then able to route the profile management request to the correct subscription management service for handling after completing the determination. While the amount of computing processing resources consumed for perform each such eSIM profile management request routing is relatively insignificant, the aggregate effect of performing tens of thousands of such request routing on a daily basis may consume a substantial amount of computational resources. However, if the entity is solely paired to a single subscription management service, then it is possible for the eSIM management platform to route profile management requests for any particular eSIM profile without the use of a management routing table.

Furthermore, the pairing of an entity solely to a single subscription management service may also reduce operational complexity for making deployment changes to the subscription management services. For example, when the responsibility for handling eSIM profile management for a particular entity is transferred between different subscription management services, the sole pairing means that the underlying eSIM profile data is transferred from a single subscription management service to another single subscription management service, rather than from multiple subscription management services to multiple subscription management services. Such one-to-one eSIM profile data transfer reduces the number of data transfer coordination that take place between different subscription management services. The techniques described herein may be implemented in a number of ways. Example implementations are provided below with reference to the following FIGS. 1-8.

Example Architecture

FIG. 1 illustrates an example architecture 100 that enables the pairing of an entity that is receiving telecommunication services from a wireless communication carrier solely to a single subscription management service. The wireless communication carrier 102 may provide a wide range of mobile communication services, as well as ancillary services and features, to subscribers and associated mobile device users. The wireless communication carrier 102 may also be referred to as a mobile network operator (MNO). In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A RAN of the wireless communication carrier 102 may include a number of base stations, also referred as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

In various embodiments, 2G and/or 3G network components of the wireless communication carrier 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless communication carrier 102 may include an Evolved Packet Core (EPC) and an IP multimedia Subsystem (IMS) core.

The wireless communication carrier 102 may provide telecommunication services to multiple user devices, which may include consumer devices and M2M devices. Consumer devices are network-capable device that are generally marketed to individual consumers, and are capable of obtain telecommunication and/or data communication services from the wireless communication carrier 102. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, i.e., an integrated circuit chip that is directly wired or soldered to a circuit board of the user device. The eUICC may store one or more eSIM profiles, in which eSIM profile may include information for accessing telecommunication services provided by a corresponding wireless communication carrier, such as the wireless communication carrier 102. Each user device may be further equipped with a modem that enables the user device to perform telecommunication and data communication with the wireless communication carrier 102. Accordingly, the modem may encode digital information for transmission in uplink radio signals to the wireless communication carrier 102, as well as decode digital information that are received from the wireless communication carrier 102 via downlink radio signals.

The backend servers of the wireless communication carrier 102 may provide an eSIM management platform 104. The eSIM management platform 104 may serve as a central interface between the entities 106(1)-106(N) and one or more subscription management services, such as the subscription management services 108(1)-108(N). Each of the entities 106(1)-106(N) may be a third-party partner of the wireless communication carrier, a M2M device vendor, a M2M device operator, and/or so forth. A third-party partner of the wireless communication carrier 102 may be a provider that provides content or services to the subscribers of the carrier. However, in other instances, an entity may be a network aggregator or a hub. A network aggregator or a hub is a telecommunication service provider that consolidates carrier services provided by multiple wireless communication carriers into a single carrier service for offering to subscribers.

In various embodiments, the eSIM management platform 104 may include an application program interface (API) abstraction layer that provides multiple APIs to the various entities, in which the entities may call the APIs to initiate profile management operations. Accordingly, the eSIM management platform 104 enables the entities to manage eSIM profiles for deployment into eUICCs of user devices. Each of the subscription management services 108(1)-108(N) is responsible for the management of one or more sets of eSIM profiles that are provisioned to eUICCs of particular user devices. A set of eSIM profiles managed by each subscription management service may belong to one or more specific entities. Each of the subscription management services 108(1)-108(N) may be provided by one or more subscriber managers. In some embodiments, each of the subscription management services 108(1)-108(N) may be provided by at least one Subscription Manager Data Preparation (SM-DP), at least one Subscription Manager Data Preparation Plus (SM-DP+), and at least one Subscription Manager Secure Routing (SM-SR).

In its role as the central interface, the eSIM management platform 104 may receive a request from an entity to provision an eUICC of a user device with an eSIM profile, delete an eSIM profile from the eUICC, activate an eSIM profile that is stored in the eUICC for use to obtain communication services from a wireless communication carrier. In turn, the eSIM management platform 104 may relay the request to the appropriate subscription management service of the multiple subscription management services that is responsible for managing the affected eSIM profile. Following the completion of the request, the eSIM management platform 104 may provide a notification to the entity indicating that the request has been fulfilled.

In operation, a subscription management service, such as the subscription management service 108(1), may receive eSIM profiles from one or more eSIM profile vendors. An eSIM profile vendor may transmit the eSIM profiles to the subscription management service 108(1) over a communication link that is established between the vendor and the service. For example, the eSIM profiles may be delivered to the subscription management service 108(1) in response to an eSIM profile order from the wireless communication carrier 102. However, in some instances, the eSIM profile order may be initiated by another entity, such as a wireless communication carrier that is hosted by the wireless communication carrier 102, or another third-party partner of the wireless communication carrier 102. The hosted wireless communication carrier may be a mobile virtual network operator (MVNO), a virtual network operator (VNO), or a mobile other licensed operator (MOLO). The eSIM profiles that are received by the subscription management service 108(1) may include eSIM profiles for M2M devices and eSIM profiles for consumer devices.

The eSIM profiles for M2M device, also referred to as M2M eSIM profiles, may be loaded into the profile data stores of SM-DPs that implement a subscription management service, such as the subscription management service 108(1). In various instances, the profile data stores of each of the SM-DPs may hold M2M eSIM profiles that are ordered by a single entity or different entities. Along with the loading of the M2M eSIM profiles into one or more SM-DPs, the eSIM profile vendor also provides eUICC ID (EIDs) of eUICCs that are for use by the M2M devices. Accordingly, the M2M eSIM profiles may be eventually deployed on these eUICCs. Such EIDs, referred to as M2M EIDs, are loaded into a data store of the SM-SR that implement the subscription management service. On the other hand, the eSIM profiles for consumer devices, also referred to as consumer eSIM profiles, may be loaded into profile state stores of a SM-DP+ that implement the subscription management service.

In various embodiments, the eSIM management platform 104 may enforce the pairing of each entity solely to a single subscription management service. The pair of a particular entity to a specific subscription management service means that the specific subscription management service is solely responsible for handling eSIM profile management for the particular entity. For example, the entity 106(1), with the identifier "$E_1$" may be solely mapped to the subscription management service 108(1), with the identifier "$Subman_1$", via mapping 110. The mapping 110 may be stored by the eSIM management platform 104 as "$\{E_1 \texttt{<-->} Subman_1\}$" in a routing map table 112. The routing map table 112 may store various mappings between the identifiers of the entities 106(1)-106(N) and subscription management services 108(1)-108(N) that are mapped to them. The routing map table 112 may be maintained in a data store of the eSIM management platform 104. The data store may include one or more databases, such as relational databases, object databases, object-relational databases, and/or key-value databases. The routing map table 112 may be used by the eSIM management platform 104 to route profile management communications between the entity 106(1) and the subscription management service 108(1).

In various embodiments, the profile management communications between an entity and a subscription management service may include the eSIM profile management requests that are initiated by an entity, and/or responses (e.g., notifications, acknowledgements, etc.) that the subscription management service generates in reply to the requests. For example, a request may be for the subscription management service to perform an operation on an eSIM profile, such as activating the eSIM profile for use to receive telecommunication services from the wireless communication carrier, disabling the eSIM profile to terminate access of a M2M device to the telecommunication services, or deleting the eSIM profile from the eUICC of the M2M device. Other operations may include reading, modifying, or deleting the M2M EID from a SM-SR or an eUICC of a user device. Thus, when the eSIM management platform 104 receives a profile management request that is identifiable by the entity identifier "$E_1$", the eSIM management platform 104 may simply use the mapping 110 to determine that the identifier "$E_1$" maps to "$Subman_1$," and then route the request to the subscription management service 108(1). In another example, the eSIM management platform 104 may receive a request completion notification from the subscription management service 108(1), in which the notification includes a notification recipient identifier "$E_1$". Accordingly, the eSIM management platform 104 may use the mapping 110 to determine that the notification is to be routed to the entity 106(1), and route the notification accordingly. In contrast, if the entity 106(1) is mapped to both subscription management services 108(1) and 108(2), the eSIM management platform 104 would not be able to rely on the simplified mapping of an entity to a subscription management service 108(1), such as the mapping 110, to route profile management communication. Instead, the eSIM management platform 104 will have to compare an ICCID of an eSIM profile or an EID of an associated eUICC that is embedded in every request to a complex mapping table to determine which subscription management service is responsible for handling the eSIM profile on an individual eSIM profile basis.

Additionally, eSIM management platform 104 may use the routing map table 112 to enforce the pairing of each entity solely to a single subscription management service. In various embodiments, the eSIM management platform 104 may receive an assignment request to assign a subscription management service to handle eSIM profile management for a particular entity from an authorized requesting party. In various embodiments, the assignment request may be initiated by a business support system (BSS) and/or an operation support system (OSS) of the wireless communication carrier 102. In an instance in which the assignment request includes a designation of a specific subscription management service for a particular entity, the eSIM management platform 104 may check the routing map table 112 to determine whether the entity is already associated with another subscription management service. Thus, if the entity is already associated with another subscription management service, the eSIM management platform 104 may reject the request and send an error notification to the authorized requesting party. Otherwise, the eSIM management platform 104 maps the entity to the subscription management service selected in the assignment request such that the subscription management service may handle profile management for the entity.

However, in an instance in which the assignment request does not include a designation of a specific subscription management service for the particular entity, the eSIM management platform 104 directly use the routing map table 112 to perform a check. The check involves determining whether the entity is already associated with another subscription management service. Thus, if the entity is already associated with another subscription management service, the eSIM management platform 104 may reject the request and send an error notification to the authorized requesting party. Otherwise, the eSIM management platform 104 selects a subscription management service, and then maps the entity to the selected subscription management service such that the subscription management service may handle profile management for the entity. In various embodiments, the eSIM management platform 104 may select the subscription management service for pairing with the entity in a randomly fashion, in a round robin fashion, or based on a geographical proximity of the subscription management service to the entity. For example, the eSIM management platform 104 may select a subscription management service of the multiple subscription management services that is closest in geographical proximity to the entity for pairing.

While the pairing rule enforced by the eSIM management platform 104 requires that each entity be solely paired to a single subscription management service, it is not a requirement that each subscription management service handle profile management for only one subscription management service. Indeed, the pairing rule permits a single subscription management service to be paired with multiple entities such that the single subscription management service handles the profile management for the multiple entities. For example, the entity 106(2), with the identifier "$E_2$", and the entity 106(N), with the identifier "$E_3$", may both be simultaneously paired to the subscription management service 108(N), with the identifier "$Subman_3$", via a mapping 114. The mapping 114 as stored in the routing map table 112 may contain the entries "$\{E_2 \texttt{<-->} Subman_3\}$" and "$\{E_3 \texttt{<-->} Subman_3\}$".

Accordingly, the eSIM management platform 104 may use the mapping 114 to route profile management communications between the subscription management service 108(N) and both the entities 106(2) and 106(N). For example, a profile management request from the entity 106(2) may contain the identifier "$E_2$". As such, the eSIM management platform 104 may use the mapping 114 to determine that the profile management request is to be routed to the subscription management service with the identifier "$Subman_3$", which is the subscription management service 108(N). The routing of the profile management request is then performed by the eSIM management platform 104 according to the determination. In another example, the eSIM management platform 104 may receive a request completion notification from the subscription management service 108(N), in which the notification includes a notification recipient identifier "$E_3$,". Accordingly, the eSIM management platform 104 may use the mapping 114 to determine that the notification is to be routed to the entity 106(N), and then perform the routing of the notification.

Example Operation Scenarios

Figure 2:
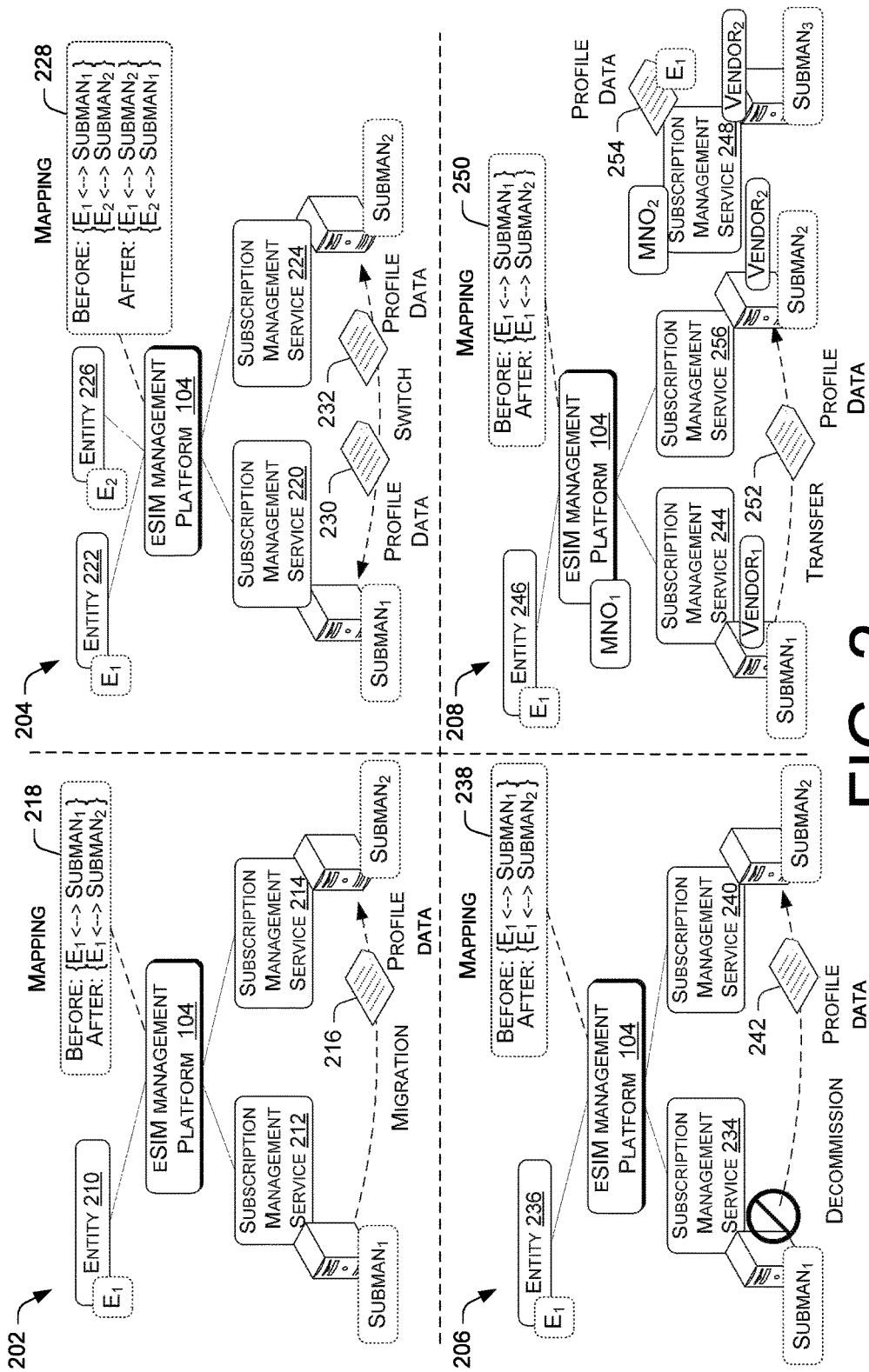
FIG. 2 illustrates operation scenarios in which a pairing of an entity solely to a single subscription management service provides for simplified mapping changes at the eSIM management platform for providing profile management to the entity.

FIG. 2 illustrates operation scenarios 202-208 in which a pairing of an entity solely to a single subscription management service provides for simplified mapping changes at the eSIM management platform for providing profile management to the entity. In operation scenario 202, the profile management for the entity 210 (identifier "$E_1$") may migrate from the subscription management service 212 (identifier "$Subman_1$") to the subscription management service 214 (identifier "$Subman_2$"). The original mapping that is stored by the eSIM management platform 104 is "{$E_1$<--> $Subman_1$}". The migration may be initiated by a BSS or an OSS of a wireless communication carrier. In this scenario, the eSIM management platform 104 may initiate transfer of the profile data 216 of the entity 210 from the subscription management service 212 to the subscription management service 214. In various embodiments, the profile data, such as the profile data 216, may include eSIM profiles and associated profile information. The profile information may include profile state data for each eSIM profile, in which the profile state data may indicate a status of the eSIM profile (e.g., in use, suspended, deleted, etc.). The profile information of an eSIM profile may further include identification information associated with the eSIM profile, such as an ICCID of the eSIM profile, an EID of an associated eUICC, an associated mobile network operator (MNO) identifier, a subscription management service identifier, an entity identifier, and/or an eSIM manufacturer (EUM) identifier.

Following the transfer of the profile data 216 from the subscription management service 212 to the subscription management service 214, the eSIM management platform 104 may change the mapping 218 from "{$E_1$<--> $Subman_1$}" to "{$E_1$<--> $Subman_2$}". In this way, the subscription management service 214 may seamlessly take over profile management for the entity 210 from the subscription management service 212.

In operation scenario 204, the subscription management service 220 (identifier "$Subman_1$") may be handling profile management for an entity 222 (identifier "$E_1$"), and the subscription management service 224 (identifier "$Subman_2$") may be handing profile management for an entity 226 (identifier "$E_2$"). Accordingly, the mapping 228 that is stored by the eSIM management platform 104 is "{$E_1$<--> $Subman_1$}" and "{$E_2$<--> $Subman_2$}". In such a scenario, a switch operation may be performed such that the subscription management service 220 (identifier "$Subman_1$") handles profile management for entity 226 (identifier "$E_2$"), and the subscription management service 224 (identifier "$Subman_2$") handles profile management for entity 222 (identifier "$E_1$").

The migration may be initiated by a BSS or an OSS of a wireless communication carrier. In this scenario, the eSIM management platform 104 may transfer the profile data 230 of the entity 222 from the subscription management service 220 to the subscription management service 224. Likewise, the eSIM management platform 104 may initiate transfer of the profile data 232 of the entity 226 from the subscription management service 224 to the subscription management service 220. Following the transfer of the profile data 230 and 232, the eSIM management platform 104 may change the mapping 228 to "{$E_1$<--> $Subman_2$}" and "{$E_2$<--> $Subman_1$}". In this way, the profile management provided by the subscription management service 220 to the entity 222 and provided by the subscription management service 224 to the entity 226 may be seamlessly switched.

In operation scenario 206, the subscription management service 234 (identifier "$Subman_1$") may be handling profile management for an entity 236 (identifier "$E_1$"). Accordingly, the mapping 238 that is stored by the eSIM management platform 104 is "{$E_1$<--> $Subman_1$}". In such a scenario, a decommission operation may be performed such that the subscription management service 240 (identifier "$Subman_2$") takes over the handling of profile management for the entity 236.

The transfer of profile management and the decommissioning may be initiated by the BSS or the OSS of a wireless communication carrier. In this scenario, the eSIM management platform 104 may initiate transfer of the profile data 242 of the entity 236 from the subscription management service 234 to the subscription management service 240. Following the transfer of the profile data 242, the eSIM management platform 104 may change the mapping 238 to "{$E_1$<--> $Subman_2$}". In this way, the subscription management service 240, instead of the subscription management service 234, may provide profile management to the entity 236. In turn, the subscription management service 234 is decommissioned, i.e., taken out of service.

In operation scenario 208, a subscription management service 244 (identifier "$Subman_1$") is providing profile management to an entity 246 (identifier "$E_1$"). The subscription management service 244 may be operated by a first service vendor ($Vendor_1$) under the control of a first wireless communication carrier ($MNO_1$). For example, the subscription management service 244 may be hosted on a computing cloud of the first service vendor ($Vendor_1$) for use by the first wireless communication carrier ($MNO_1$). The first wireless communication carrier also operates the eSIM management platform 104. Accordingly, the mapping 250 that is stored by the eSIM management platform 104 is "{$E_1$<--> $Subman_1$}". In various embodiments, the subscription management service 244 may manage profile data 252 that enables user devices deployed by the entity 246 to use the telecommunication services provided by the first wireless communication carrier ($MNO_1$).

Furthermore, a subscription management service 248 (identifier "$Subman_3$") that is operated by a second service vendor ($Vendor_2$) may be providing additional profile management to the entity 246. The second service vendor ($Vendor_2$) may be controlled by a second wireless communication carrier ($MNO_2$). The subscription management service 244 may manage profile data 254 for additional user devices deployed by the entity 246 that enables the additional user devices to use the telecommunication services provided by the second wireless communication carrier ($MNO_2$).

In such a scenario, the entity 246 may submit a request for the eSIM management platform 104 to transfer profile management for user devices that use the telecommunication services provided by the first wireless communication carrier ($MNO_1$) to another subscription management service. Specifically, the entity 246 may request that the profile management to be transferred from the subscription management service 244 (identifier "Subman$_1$") to the subscription management service 256 ((identifier "Subman$_2$"). The subscription management service 256 (identifier "Subman$_2$") may be operated by the second service vendor (Vendor$_2$), but is also operated under the control of the first wireless communication carrier (MNO$_1$). The entity 246 may make such a request so that all of its profile data (e.g., profile data 252 and profile data 254) are managed by subscription management services operated by the same vendor (e.g., the second service vendor), regardless of the carrier that is controlling the operation service. Such a request may be prompted by an agreement between the entity 246 and the second service vendor (Vendor$_2$).

Accordingly, the eSIM management platform 104 may initiate transfer of the profile data 252 of the entity 246 from the subscription management service 244 to the subscription management service 256. Following this transfer of the profile data 252, the eSIM management platform 104 may change the mapping 250 from "{E$_1$<--> Subman$_1$}" to "{E$_1$<--> Subman$_2$}". In this way, the subscription management service 256 that is operated by the second service vendor (Vendor$_2$) may seamlessly take over profile management for the entity 246 from the subscription management service 244 that is operated by the first service vendor (Vendor$_1$). Additional details regarding the operations performed by the eSIM management platform 104 with respect to the operation scenarios 202-208 are described in FIGS. 4-8.

Example Computing Device Components

Figure 3:
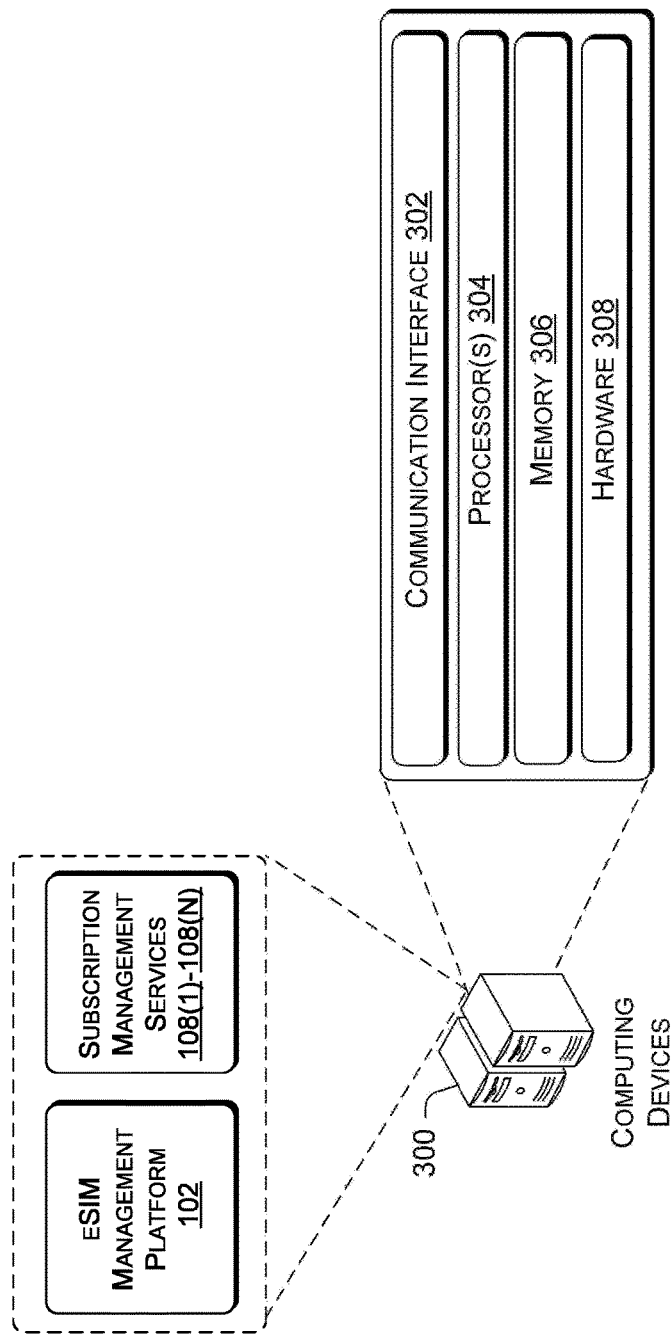
FIG. 3 is a block diagram showing various components of one or more illustrative computing devices that support simplified mapping changes at the eSIM management platform for providing profile management services to the entity.

FIG. 3 is a block diagram showing various components of one or more illustrative computing devices that support simplified mapping changes at the eSIM management platform for providing profile management services to the entity. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 300 or components thereof may be virtual computing devices in the form of virtual machines or software containers that are hosted in a computing cloud.

The computing devices 300 may implement various back-end services and components of the wireless communication carrier 102, such as the eSIM management platform 104, the subscription management services 108(1)-108(N), the BSS, the OSS, and/or so forth. The implementation involves the execution of software, applications, and/or modules that include routines, program instructions, code segments, objects, and/or data structures that perform particular tasks or implement particular abstract data types.

Example Processes

FIGS. 4-8 present illustrative processes 400-800 for providing eSIM profile management to an entity that is paired solely to a single subscription management service. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
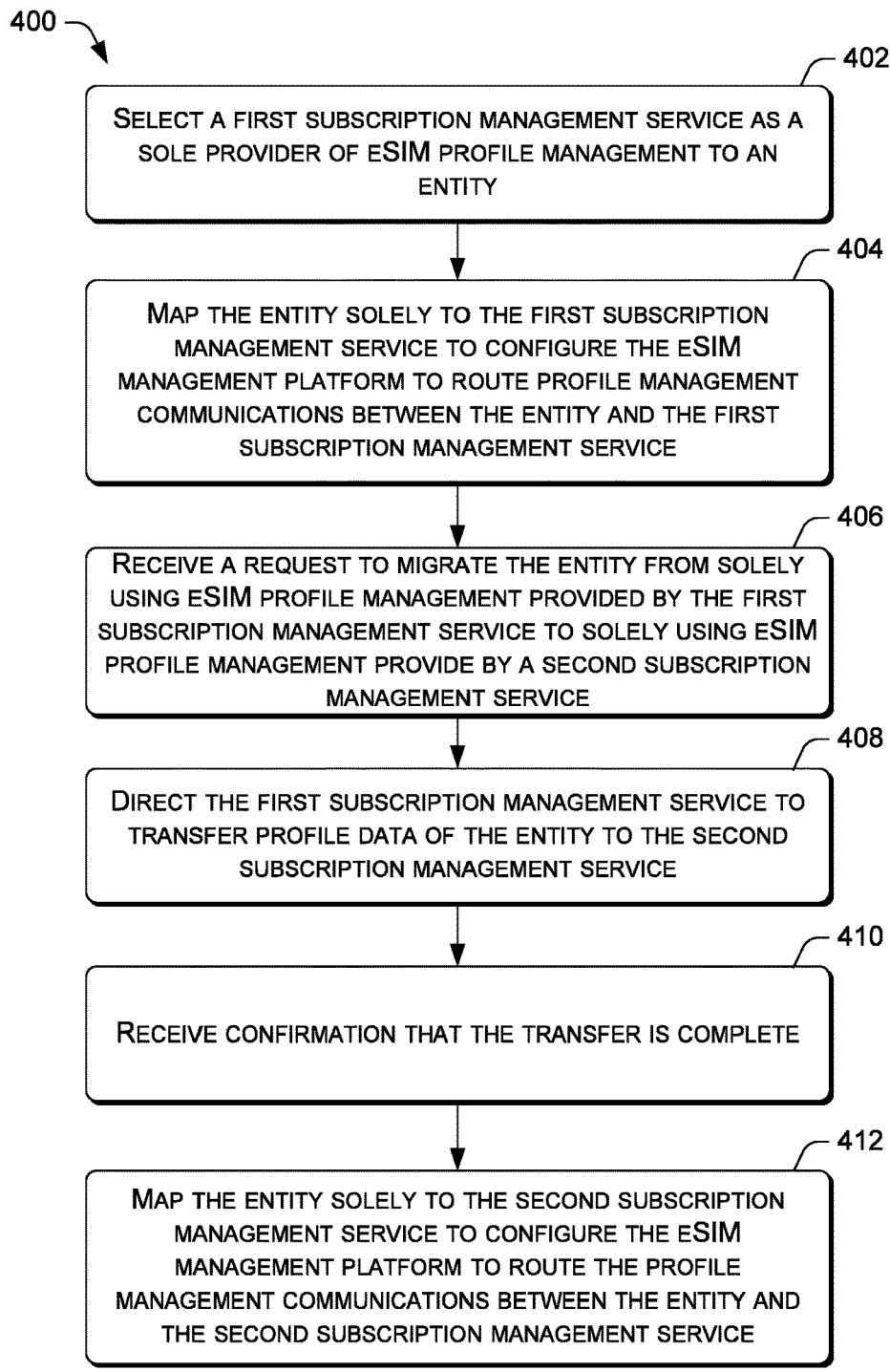
FIG. 4 is a flow diagram of an example process for implementing simplified mapping changes for a pairing of an entity solely to a single subscription management service to perform eSIM profile management migration.

FIG. 4 is a flow diagram of an example process 400 for implementing simplified mapping changes for a pairing of an entity solely to a single subscription management service to perform eSIM profile management migration. At block 402, the eSIM management platform 104 may select a first subscription management service as a sole provider of eSIM profile management to an entity. In some embodiments, the selection may be made based on a designation of a specific subscription management service in a request from the BSS or OSS of a wireless communication carrier, or in a request from the entity. In other embodiments, the eSIM management platform 104 may make the selection in a randomly fashion, in a round robin fashion, or based on a geographical proximity of the subscription management service to the entity.

At block 404, the eSIM management platform 104 may map the entity solely to the first subscription management service to configure the eSIM management platform 104 to route profile management communications between the entity and the first subscription management service. In various embodiments, the mapping may be stored in a data store of the eSIM management platform 104.

At block 406, the eSIM management platform 104 may receive a request to migrate the entity from solely using the eSIM profile management provided by the first subscription management service to solely using eSIM profile management provided by a second subscription management service. In various embodiments, the request may be initiated by the BSS or the OSS of the wireless communication carrier, or by an entity.

At block 408, the eSIM management platform 104 may direct the first subscription management service to transfer profile data of the entity to the second subscription management service. The profile data of the entity may be initially stored in a data store of the first subscription management service. In various embodiments, the transfer may include the second subscription management service duplicating the relevant profile data of the entity as stored at the first subscription management service into its data store. Subsequently, the first subscription management service may delete the profile data of the entity from its data store. The duplication and deletion transactions may be performed in an atomic manner with transaction rollback protection. The profile data may include eSIM profiles and associated profile information.

At block 410, the eSIM management platform 104 may receive a confirmation that the transfer is complete. The confirmation may include transaction completion notifications from the first subscription management service and/or the second subscription management service.

At block 412, the eSIM management platform 104 may map the entity solely to the second subscription management service to configure the eSIM management platform 104 to route the profile management communications between the entity and the second subscription management service. In various embodiments, the mapping may be stored in a data store of the eSIM management platform 104.

Figure 5:
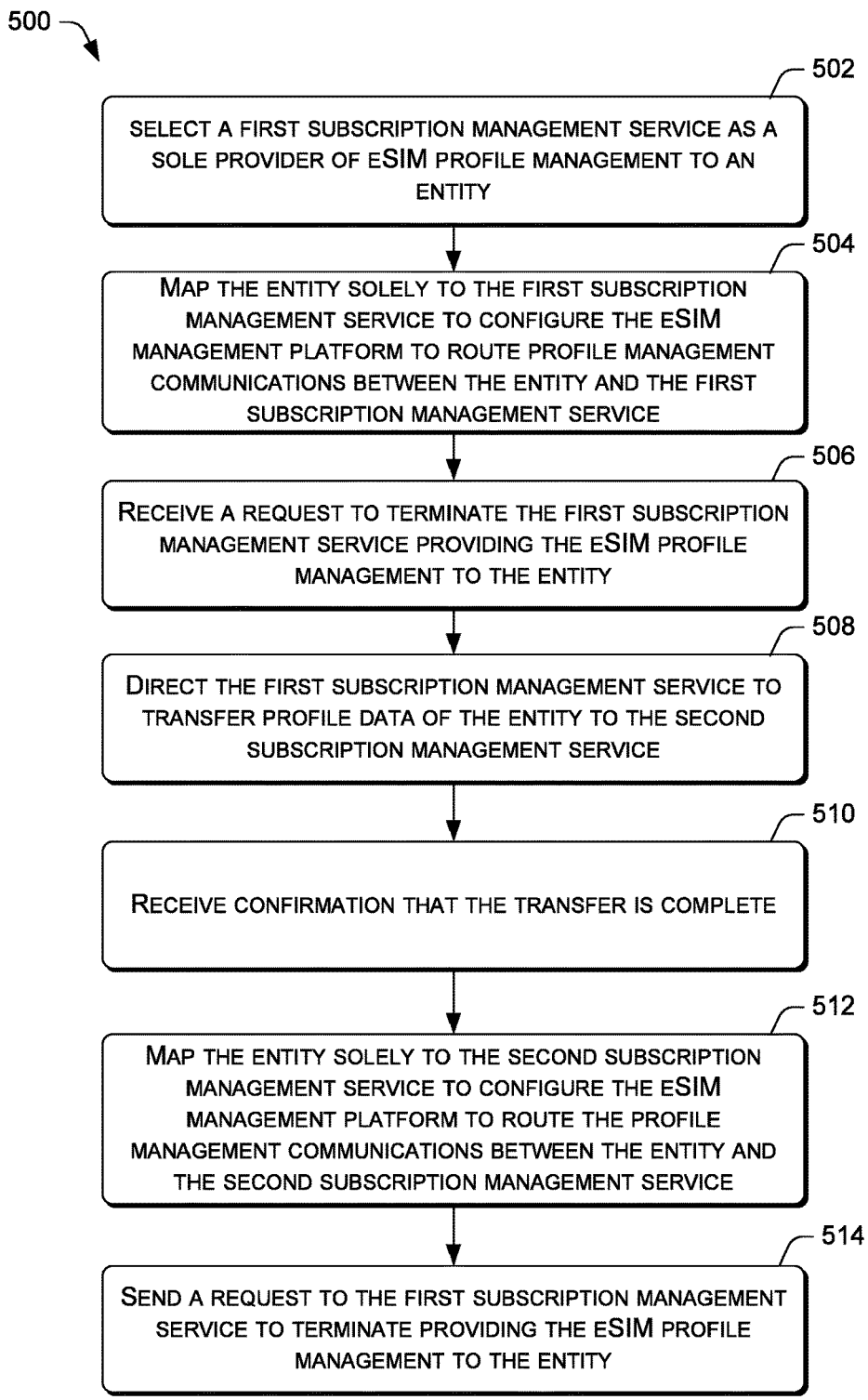
FIG. 5 is a flow diagram of an example process for implementing simplified mapping changes for a pairing of an entity solely to a single subscription management service to decommission a subscription management service.

FIG. 5 is a flow diagram of an example process 500 for implementing simplified mapping changes for a pairing of an entity solely to a single subscription management service to decommission a subscription management service. At block 502, the eSIM management platform may select a first subscription management service as a sole provider of eSIM profile management to an entity. In some embodiments, the selection may be made based on a designation of a specific subscription management service in a request from the BSS or OSS of a wireless communication carrier, or in a request from the entity. In other embodiments, the eSIM management platform 104 may make the selection in a randomly fashion, in a round robin fashion, or based on a geographical proximity of the subscription management service to the entity.

At block 504, the eSIM management platform 104 may map the entity solely to the first subscription management service to configure the eSIM management platform 104 to route profile management communications between the entity and the first subscription management service. In various embodiments, the mapping may be stored in a data store of the eSIM management platform 104.

At block 506, the eSIM management platform 104 may receive a request to terminate the first subscription management service providing eSIM profile management to the entity. The transfer of profile management and the decommissioning may be initiated by a BSS or an OSS of a wireless communication carrier.

At block 508, the eSIM management platform 104 may direct the first subscription management service to transfer profile data of the entity to the second subscription management service. The profile data of the entity may be initially stored in a data store of the first subscription management service. In various embodiments, the transfer may include the second subscription management service duplicating the relevant profile data of the entity as stored at the first subscription management service into its data store. Subsequently, the first subscription management service may delete the profile data of the entity from its data store. The duplication and deletion transactions may be performed in an atomic manner with transaction rollback protection. The profile data may include eSIM profiles and associated profile information.

At block 510, the eSIM management platform 104 may receive a confirmation that the transfer is complete. The confirmation may include transaction completion notifications from the first subscription management service and/or the second subscription management service.

At block 512, the eSIM management platform 104 may map the entity solely to the second subscription management service to configure the eSIM management platform 104 to route the profile management communications between the entity and the second subscription management service. In various embodiments, the mapping may be stored in a data store of the eSIM management platform 104. At block 514, the eSIM management platform 104 may send a request to the first subscription management service to terminate providing eSIM profile management to the entity.

Figure 6:
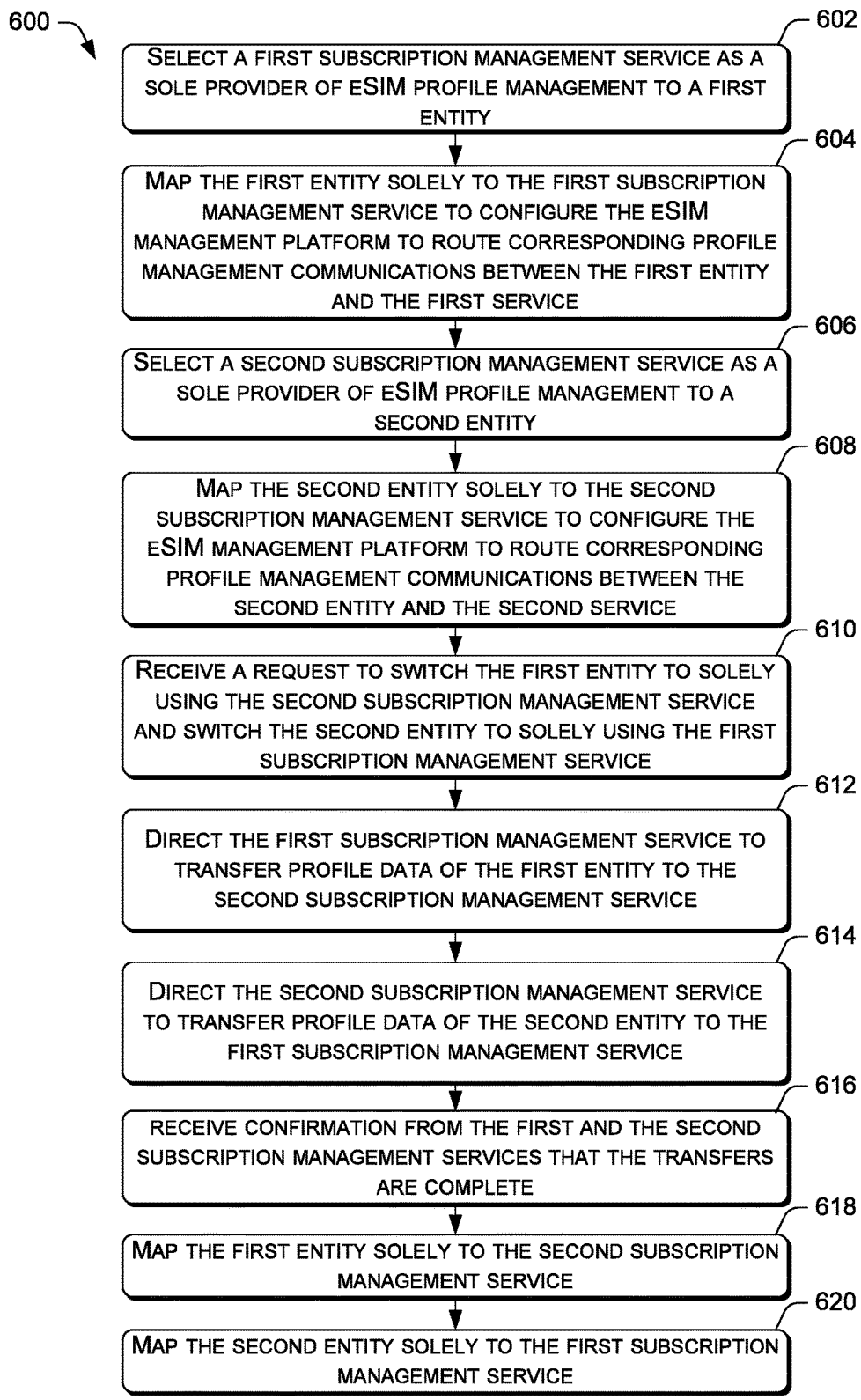
FIG. 6 is a flow diagram of an example process for implementing simplified mapping changes for a pairing of an entity solely to a single subscription management service to perform eSIM profile management switching for multiple entities.

FIG. 6 is a flow diagram of an example process 600 for implementing simplified mapping changes for a pairing of an entity solely to a single subscription management service to perform eSIM profile management switching for multiple entities. At block 602, the eSIM management platform 104 may select a first subscription management service as a sole provider of eSIM profile management to a first entity. In some embodiments, the selection may be made based on a designation of a specific subscription management service in a request from the BSS or OSS of a wireless communication carrier, or in a request from the first entity. In other embodiments, the eSIM management platform 104 may make the selection in a randomly fashion, in a round robin fashion, or based on a geographical proximity of the subscription management service to the first entity.

At block 604, the eSIM management platform 104 may map the first entity solely to the first subscription management service to configure the eSIM management platform 104 to route corresponding profile management communications between the first entity and the first subscription management service. In various embodiments, the mapping may be stored in a data store of the eSIM management platform 104.

At block 606, the eSIM management platform 104 may select a second subscription management service as a sole provider of eSIM profile management to a second entity. In some embodiments, the selection may be made based on a designation of a specific subscription management service in a request from the BSS or OSS of a wireless communication carrier, or in a request from the second entity. In other embodiments, the eSIM management platform 104 may make the selection in a randomly fashion, in a round robin fashion, or based on a geographical proximity of the subscription management service to the second entity.

At block 608, the eSIM management platform 104 may map the second entity solely to the second subscription management service to configure the eSIM management platform 104 to route corresponding profile management communications between the second entity and second first subscription management service. In various embodiments, the mapping may be stored in a data store of the eSIM management platform 104.

At block 610, the eSIM management platform 104 may receive a request to switch the first entity to solely using the second subscription management service for eSIM profile management, and to switch the second entity to solely using the first subscription management service for eSIM profile management.

At block 612, the eSIM management platform 104 may direct the first subscription management service to transfer profile data of the first entity to the second subscription management service. The profile data of the first entity may be initially stored in a data store of the first subscription management service. In various embodiments, the transfer may include the second subscription management service duplicating the relevant profile data of the first entity as stored at the first subscription management service into its data store. Subsequently, the first subscription management service may delete the profile data of the first entity from its data store. The duplication and deletion transactions may be performed in an atomic manner with transaction rollback protection. The profile data may include eSIM profiles and associated profile information.

At block 614, the eSIM management platform 104 may direct the second subscription management service to transfer profile data of the second entity to the first subscription management service. The profile data of the second entity may be initially stored in a data store of the second subscription management service. In various embodiments, the transfer may include the first subscription management service duplicating the relevant profile data of the second entity as stored at the second subscription management service into its data store. Subsequently, the second subscription management service may delete the profile data of the second entity from its data store. The duplication and deletion transactions may be performed in an atomic manner with transaction rollback protection. The profile data may include eSIM profiles and associated profile information.

At block 616, the eSIM management platform 104 may receive a confirmation that the transfer is complete. The confirmation may include transaction completion notifications from the first subscription management service and the second subscription management service. At block 618, the eSIM management platform 104 may map the first entity solely to the second subscription management service to configure the eSIM management platform 104 to route the corresponding profile management communications between the first entity and the second subscription management service. In various embodiments, the mapping may be stored in a data store of the eSIM management platform 104.

At block 620, the eSIM management platform 104 may map the second entity solely to the first subscription management service to configure the eSIM management platform 104 to route the corresponding profile management communications between the second entity and the first subscription management service. In various embodiments, the mapping may be stored in a data store of the eSIM management platform 104.

Figure 7:
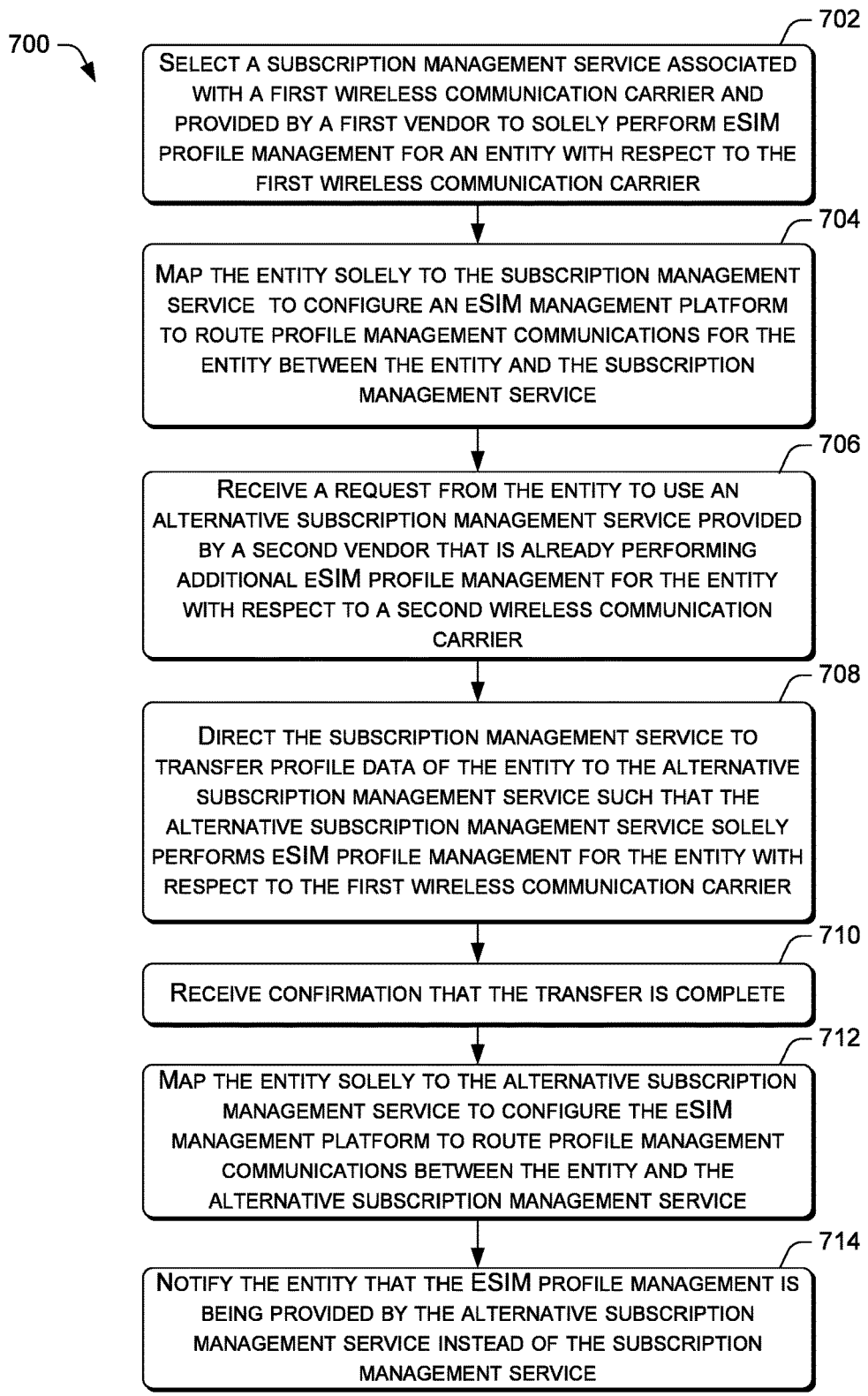
FIG. 7 is a flow diagram of an example process for implementing simplified mapping changes for a pairing of an entity solely to a single subscription management service to perform eSIM profile management transfer between vendors.

FIG. 7 is a flow diagram of an example process 700 for implementing simplified mapping changes for a pairing of an entity solely to a single subscription management service to perform eSIM profile management transfer between vendors. At block 702, the eSIM management platform 104 may select a subscription management service associated with a wireless communication carrier, and provided by a first vendor, to solely perform eSIM profile management for an entity with respect to the first wireless communication carrier. In various embodiments, the wireless communication carrier is the wireless communication carrier 102 that operates the eSIM management platform 104. The eSIM profile management provided by the subscription management service with respect to the first wireless communication carrier may enable user devices that are distributed and/or controlled by the entity to use telecommunication services of the first wireless communication carrier.

At block 704, the eSIM management platform 104 may map the entity solely to the subscription management service to configure the eSIM management platform 104 to route the profile management communications between the entity and the subscription management service. In various embodiments, the mapping may be stored in a data store of the eSIM management platform 104. Subsequently, the eSIM management platform 104 may send an electronic notification to a computing device of the entity indicating that the eSIM profile management is being provided by the subscription management service. For example, the electronic notification may be a configuration status message, an email message, a text message, etc.

At block 706, the eSIM management platform 104 may receive a request from the entity to use an alternative subscription management service provided by a second vendor, in which the alternative subscription management service is already performing additional profile management for the entity with respect to a second wireless communication carrier. The eSIM profile management provided by the alternative subscription management service with respect to the second wireless communication carrier may enable user devices that are distributed and/or controlled by the entity to use telecommunication services of the second wireless communication carrier.

At block 708, the eSIM management platform 104 may direct the subscription management service to transfer profile data of the entity to the alternative subscription management service such that the alternative subscription management service solely performs eSIM profile management for the entity with respect to the first wireless communication carrier. The profile data of the entity may be initially stored in a data store of the subscription management service. In various embodiments, the transfer may include the alternative subscription management service duplicating the relevant profile data of the entity as stored at the subscription management service into its data store. Subsequently, the first subscription management service may delete the profile data of the entity from its data store. The duplication and deletion transactions may be performed in an atomic manner with transaction rollback protection. The profile data may include eSIM profiles and associated profile information.

At block 710, the eSIM management platform 104 may receive a confirmation that the transfer is complete. The confirmation may include transaction completion notifications from the subscription management service and/or the alternative subscription management service.

At block 712, the eSIM management platform 104 may map the entity solely to the alternative subscription management service to configure the eSIM management platform 104 to route the profile management communications between the entity and the alternative subscription management service. In various embodiments, the mapping may be stored in a data store of the eSIM management platform 104.

At block 714, the eSIM management platform 104 may notify the entity that the eSIM profile management is being provided by the alternative subscription management service instead of the subscription management service. In various embodiments, the notification may be an electronic notification that is sent to a computing device of the entity. For example, the electronic notification may be a configuration status message, an email message, a text message, etc.

Figure 8:
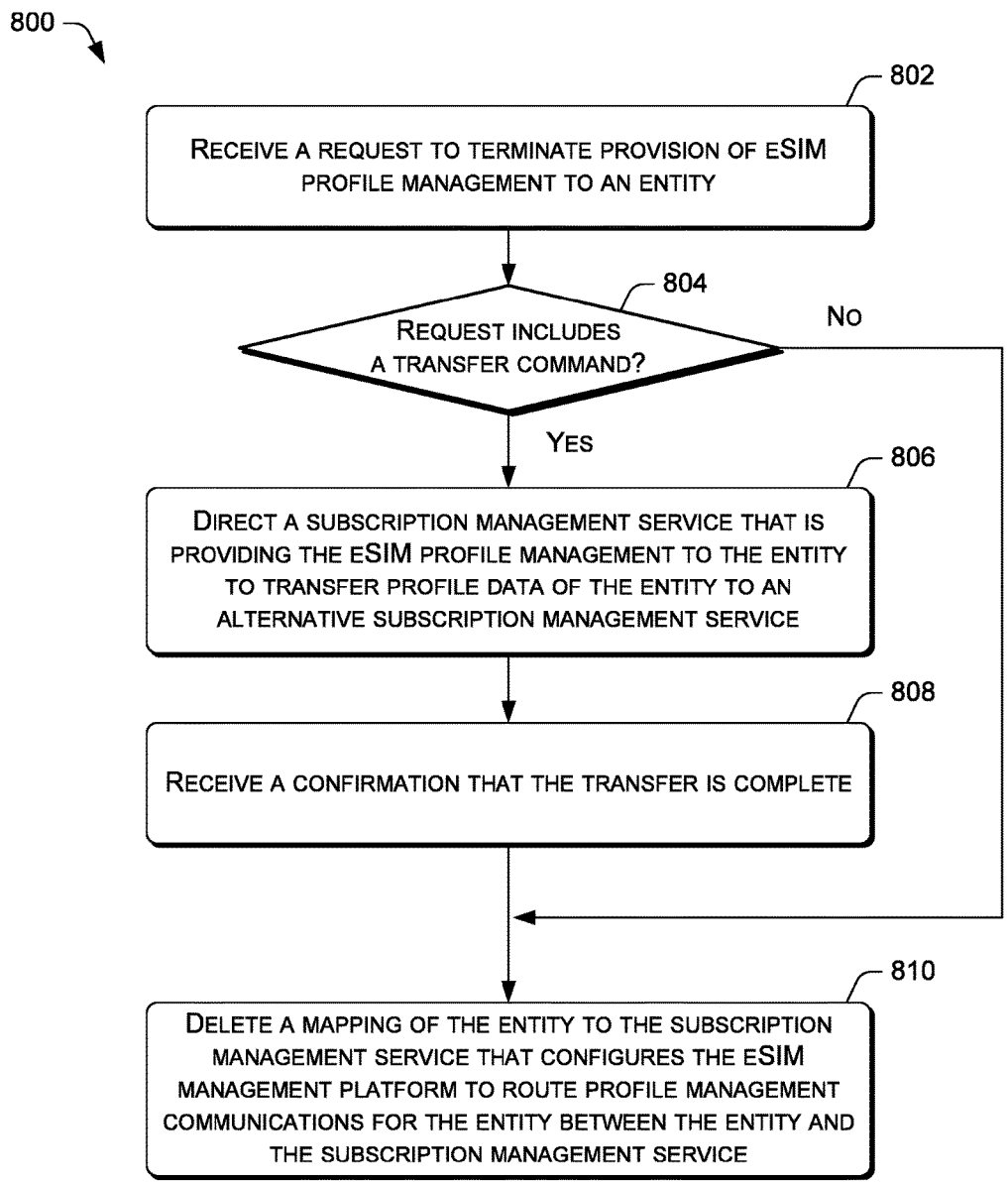
FIG. 8 is a flow diagram of an example process for terminating provisioning of eSIM profile management for an entity in which the entity is paired solely to a single subscription management service.

FIG. 8 is a flow diagram of an example process 800 for terminating provisioning of eSIM profile management for an entity in which the entity is paired solely to a single subscription management service. At block 802, the eSIM management platform 104 may receive a request to terminate provision of eSIM profile management to an entity. In various embodiments, the provision of eSIM profile management may be terminated due to an expiration or a termination of a service contract between the entity and the wireless communication carrier 102 that operates the eSIM management platform 104. The request may be initiated by the eSIM management platform 104 in response to the eSIM management platform 104 receive a termination notification from the BSS or the OSS of the wireless communication carrier 102, or from the entity.

At decision block 804, the eSIM management platform 104 may determine whether the request includes a transfer command. In various embodiments, the transfer command may indicate that the provision of the eSIM profile management is to be transferred to an alternative subscription management service. In various embodiments, the alternative subscription management service may be operated by another wireless communication carrier. Thus, if the eSIM management platform 104 determines that the request includes a transfer command ("yes" at decision block 804), the process 800 may proceed to block 806.

At block 806, the eSIM management platform 104 may direct a subscription management service that is operated by the wireless communication carrier 102 for providing the eSIM profile management to the entity to transfer the profile data of the entity to the alternative subscription management service. In various embodiments, the transfer may include the alternative subscription management service duplicating the relevant profile data of the entity as stored at the subscription management service into its data store. Subsequently, the subscription management service may delete the profile data of the entity from its data store. The duplication and deletion transactions may be performed in an atomic manner with transaction rollback protection. The profile data may include eSIM profiles and associated profile information.

At block 808, the eSIM management platform 104 may receive a confirmation that the transfer is complete. The confirmation may include transaction completion notifications from the subscription management service and/or the alternative subscription management service.

At block 810, the eSIM management platform 104 may delete a mapping of the entity to the subscription management service as stored in a data store the eSIM management platform. The mapping configures the eSIM management platform 104 to route the profile management communications between the entity and the subscription management service. In some embodiments, the eSIM management platform 104 may further direct the subscription management service to purge the profile data used by the entity from the subscription management service. The profile data may include eSIM profiles and associated profile information.

Returning to decision block 804, if the eSIM management platform 104 determines that the request does not include a transfer command ("no" at decision block 804), the process 800 may proceed to block 810.

The pairing of an entity solely to a single subscription management service may simplify the deployment of the eSIM management platform. Furthermore, the pairing of an entity solely to a single subscription management services may also reduce operational complexity for making deployment changes to the subscription management services.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

selecting a subscription management service as a sole provider of Embedded Subscriber Identity Module (eSIM) profile management to an entity in response to determining that the entity is not already mapped to another subscription management service, the subscription management service being provided by one or more subscription managers that execute on one or more computing devices, wherein the entity is a wireless communication carrier, a third-party partner of the wireless communication carrier, a network aggregator, or a hub, each of the network aggregator or the hub is a service provider that consolidates multiple carrier services into a single carrier service; and mapping the entity solely to the subscription management service to configure an eSIM management platform that is provided by the wireless communication carrier to route profile management communications for the entity between the entity and the subscription management service, the eSIM management platform providing an application program interface (API) abstraction layer for the entity to initiate profile management operations with respect to eSIM profiles.

2. The one or more non-transitory computer-readable media of claim 1, wherein the one or more subscription managers including at least one of a Subscription Manager Data Preparation (SM-DP) or a Subscription Manager Secure Routing (SM-SR).

3. The one or more non-transitory computer-readable media of claim 1, wherein the profile management communications include one or more requests that are initiated by the entity to perform the profile management operations for the eSIM profiles, or one or more responses that the subscription management service generates in reply to the one or more requests.

4. The one or more non-transitory computer-readable media of claim 1, wherein the profile management operations include performing one or more first actions for an eSIM profile that includes sending the eSIM profile for storage in an Embedded Universal Integrated Circuit Card (eUICC) of a user device, activating the eSIM profile for use to receive telecommunication services from a wireless communication carrier, disabling the eSIM profile to terminate access of the user device to the telecommunication services, or deleting the eSIM profile from the eUICC of the user device, or performing one or more second actions for a machine-to-machine (M2M) eUICC Identifier (EID) that includes reading, modifying, or deleting the M2M EID from a Subscription Manager Secure Routing (SM-SR) or an eUICC of a user device.

5. The one or more non-transitory computer-readable media of claim 1, wherein the acts further comprise:

receiving a request to migrate the entity from solely using the eSIM profile management provided by the subscription management service to solely using eSIM profile management provided by an additional subscription management service;

directing the subscription management service to transfer profile data of the entity to the additional subscription management service, the profile data including the eSIM profiles and associated profile information; and mapping the entity solely to the additional subscription management service to configure the eSIM management platform to route the profile management communications between the entity and the additional subscription management service in response to receiving a confirmation that a transfer of the profile data is complete.

6. The one or more non-transitory computer-readable media of claim 1, wherein the acts further comprise:

receiving a request to terminate the subscription management service providing the eSIM profile management to the entity;

directing the subscription management service to transfer profile data of the entity to an additional subscription management service, the profile data including the eSIM profiles and associated profile information;

mapping the entity solely to the additional subscription management service to configure the eSIM management platform to route the profile management communications between the entity and the additional subscription management service in response to receiving a confirmation that the transfer is complete; and sending a request to the subscription management service to terminate providing eSIM profile management to the entity.

7. The one or more non-transitory computer-readable media of claim 1, wherein the acts comprise:

select an additional subscription management service as a sole provider of eSIM profile management to an additional entity;

mapping the additional entity solely to the additional subscription management service to configure the eSIM management platform to route profile management communications of the additional entity between the additional entity and the additional subscription management service;

receiving a request to switch the entity to solely using eSIM profile management provided by the additional subscription management service, and the additional entity to solely using eSIM profile management provided by the subscription management service;

directing the subscription management service to transfer profile data of the entity to the additional subscription management service, and the additional subscription management service to transfer profile data of the additional entity to the subscription management service, the profile data of each entity including corresponding eSIM profiles and associated profile information; and in response to receiving a confirmation that transfers are complete, mapping the entity solely to the additional subscription management service to configure the eSIM management platform to route the profile management communications for the entity between the entity and the additional subscription management service, and mapping the additional entity solely to the subscription management service to configure the eSIM management platform to route the profile management communications for the additional entity between the additional entity and the subscription management service.

8. The one or more non-transitory computer-readable media of claim 1, wherein the subscription management service is associated with a wireless communication carrier and is provided by a first vendor, and the eSIM profile management is performed for the entity with respect to the wireless communication carrier, wherein the acts further comprise:

receiving a request from the entity to use an alternative subscription management service provided by a second vendor that is already performing additional eSIM profile management for the entity with respect to a second wireless communication carrier;

directing the subscription management service to transfer profile data of the entity to the alternative subscription management service such that the alternative subscription management service solely performs the eSIM profile management for the entity with respect to the wireless communication carrier, the profile data including the eSIM profiles and associated profile information;

mapping the entity solely to the alternative subscription management service to configure the eSIM management platform to route the profile management communications for the entity between the entity and the alternative subscription management service; and notifying the entity that the eSIM profile management is being provided by the alternative subscription management service of the second vendor instead of the subscription management service of the first vendor.

9. The one or more non-transitory computer-readable media of claim 1, wherein the acts further comprise:

receiving a request to terminate provision of the eSIM profile management to the entity; and deleting the mapping of the entity solely to the subscription management service that configures the eSIM management platform to route profile management communications for the entity between the entity and the subscription management service.

10. The one or more non-transitory computer-readable media of claim 9, wherein the request includes a transfer command, and wherein the acts further comprise directing the subscription management service to transfer profile data of the entity that includes the eSIM profiles and associated profile information to an alternative subscription management service in response to the transfer command, and wherein the deleting includes deleting the mapping in response to a confirmation that the transfer is complete.

11. A computer-implemented method, comprising:

selecting, at an eSIM management platform that is provided by a wireless communication carrier, a subscription management service as a sole provider of Embedded Subscriber Identity Module (eSIM) profile management to an entity in response to determining that the entity is not already mapped to another subscription management service, the subscription management service being provided by one or more subscription managers that execute on one or more computing devices, wherein the entity is the wireless communication carrier, a third-party partner of the wireless communication carrier, a network aggregator, or a hub, each of the network aggregator or the hub is a service provider that consolidates multiple carrier services into a single carrier service; and mapping the entity solely to the subscription management service to configure the eSIM management platform to route profile management communications for the entity between the entity and the subscription management service, the eSIM management platform providing an application program interface (API) abstraction layer for the entity to initiate profile management operations with respect to the eSIM profiles, wherein the profile management communications include one or more requests that are initiated by the entity to perform the profile management operations for the eSIM profiles, or one or more responses that the subscription management service generates in reply to the one or more requests.

12. The computer-implemented method of claim 11, wherein the profile management operations include performing one or more first actions for an eSIM profile that includes sending the eSIM profile for storage in an Embedded Universal Integrated Circuit Card (eUICC) of a user device, activating the eSIM profile for use to receive telecommunication services from a wireless communication carrier, disabling the eSIM profile to terminate access of the user device to the telecommunication services, or deleting the eSIM profile from the eUICC of the user device, or performing one or more second actions for a machine-to-machine (M2M) eUICC Identifier (EID) that includes reading, modifying, or deleting the M2M EID from a Subscription Manager Secure Routing (SM-SR) or an eUICC of a user device.

13. The computer-implemented method of claim 11, further comprising:

receiving a request to migrate the entity from solely using the eSIM profile management provided by the subscription management service to solely using eSIM profile management provided by an additional subscription management service;

directing the subscription management service to transfer profile data of the entity to the additional subscription management service, the profile data including the eSIM profiles and associated profile information; and mapping the entity solely to the additional subscription management service to configure the eSIM management platform to route the profile management communications between the entity and the additional subscription management service in response to receiving a confirmation that the transfer is complete.

14. The computer-implemented method of claim 11, further comprising:

receiving a request to terminate the subscription management service providing the eSIM profile management to the entity;

directing the subscription management service to transfer profile data of the entity to an additional subscription management service, the profile data including the eSIM profiles and associated profile information;

mapping the entity solely to the additional subscription management service to configure the eSIM management platform to route the profile management communications between the entity and the additional subscription management service in response to receiving a confirmation that the transfer is complete; and sending a request to the subscription management service to terminate providing eSIM profile management to the entity.

15. The computer-implemented method of claim 11, further comprising:

select an additional subscription management service as a sole provider of eSIM profile management to an additional entity;

mapping the additional entity solely to the additional subscription management service to configure the eSIM management platform to route profile management communications of the additional entity between the additional entity and the additional subscription management service;

receiving a request to switch the entity to solely using eSIM profile management provided by the additional subscription management service, and the additional entity to solely using eSIM profile management provided by the subscription management service;

directing the subscription management service to transfer profile data of the entity to the additional subscription management service, and the additional subscription management service to transfer profile data of the additional entity to the subscription management service, the profile data of each entity including corresponding eSIM profiles and associated profile information; and in response to receiving a confirmation that transfers are complete, mapping the entity solely to the additional subscription management service to configure the eSIM management platform to route the profile management communications for the entity between the entity and the additional subscription management service, and mapping the additional entity solely to the subscription management service to configure the eSIM management platform to route the profile management communications for the additional entity between the additional entity and the subscription management service.

16. The computer-implemented method of claim 11, wherein the subscription management service is associated with a wireless communication carrier and is provided by a first vendor, and the eSIM profile management is performed for the entity with respect to the wireless communication carrier, further comprising:

receiving a request from the entity to use an alternative subscription management service provided by a second vendor that is already performing additional eSIM profile management for the entity with respect to a second wireless communication carrier;

directing the subscription management service to transfer profile data of the entity to the alternative subscription management service such that the alternative subscription management service solely performs the eSIM profile management for the entity with respect to the wireless communication carrier;

mapping the entity solely to the alternative subscription management service to configure the eSIM management platform to route the profile management communications for the entity between the entity and the alternative subscription management service; and notifying the entity that the eSIM profile management is being provided by the alternative subscription management service of the second vendor instead of the subscription management service of the first vendor.

17. The computer-implemented method of claim 11, wherein the subscription management service is simultaneously mapped to an additional entity such that the subscription management service provides eSIM profile management to the additional entity.

18. The computer-implemented method of claim 11, wherein the one or more subscription managers including at least one of a Subscription Manager Data Preparation (SM-DP) or a Subscription Manager Secure Routing (SM-SR).

19. A system, comprising:
one or more processors; and
memory including a plurality of computer-executable components that are executable by the one or more processors to perform a plurality of acts, the plurality of acts comprising:
selecting a subscription management service as a sole provider of Embedded Subscriber Identity Module (eSIM) profile management to an entity in response to determining that the entity is not already mapped to another subscription management service, the subscription management service being provided by one or more subscription managers that execute on one or more computing devices, wherein the entity is a wireless communication carrier, a third-party partner of the wireless communication carrier, a network aggregator, or a hub, each of the network aggregator or the hub is a service provider that consolidates multiple carrier services into a single carrier service; and
mapping the entity solely to the subscription management service to configure an eSIM management platform provided by the wireless communication carrier to route profile management communications for the entity between the entity and the subscription management service, the eSIM management platform providing an application program interface (API) abstraction layer for the entity to initiate profile management operations with respect to the eSIM profiles,
wherein the profile management communications include one or more requests that are initiated by the entity to perform the profile management operations for the eSIM profiles, or responses that the subscription management service generates in reply to the one or more requests.

20. The system of claim 19, wherein the profile management operations include performing one or more first actions for an eSIM profile that includes sending the eSIM profile for storage in an Embedded Universal Integrated Circuit Card (eUICC) of a user device, activating the eSIM profile for use to receive telecommunication services from the wireless communication carrier, disabling the eSIM profile to terminate access of the user device to the telecommunication services, or deleting the eSIM profile from the eUICC of the user device, or performing one or more second actions for a machine-to-machine (M2M) eUICC Identifier (EID) that includes reading, modifying, or deleting the M2M EID from a Subscription Manager Secure Routing (SM-SR) or an eUICC of a user device.

* * * * *